(12) United States Patent
Fujii et al.

(10) Patent No.: US 6,597,846 B1
(45) Date of Patent: Jul. 22, 2003

(54) OPTICAL FIBER

(75) Inventors: Takashi Fujii, Yokohama (JP);
Toshifumi Hosoya, Yokohama (JP);
Kenji Tamano, Yokohama (JP);
Keiichiro Fukuda, Yokohama (JP);
Eisuke Sasaoka, Yokohama (JP);
Shigeru Tanaka, Yokohama (JP);
Kohei Kobayashi, Yokohama (JP)

(73) Assignee: Sumitomo Electric Industries Co., Ltd., Osaka (JP)

( * ) Notice: Subject to any disclaimer, the term of this patent is extended or adjusted under 35 U.S.C. 154(b) by 206 days.

(21) Appl. No.: 09/831,308

(22) PCT Filed: Aug. 5, 2000

(86) PCT No.: PCT/JP00/04464

§ 371 (c)(1),
(2), (4) Date: May 8, 2001

(87) PCT Pub. No.: WO01/20384

PCT Pub. Date: Mar. 22, 2001

(30) Foreign Application Priority Data

| Sep. 16, 1999 | (JP) | ............................................ 11/262281 |
| Nov. 5, 1999 | (JP) | ............................................ 11/315216 |
| Jan. 6, 2000 | (WO) | ................................. PCT/JP00/00026 |
| Jun. 27, 2000 | (JP) | ........................................ 2000/193259 |
| Jun. 27, 2000 | (JP) | ........................................ 2000/193272 |
| Jun. 27, 2000 | (JP) | ........................................ 2000/193281 |

(51) Int. Cl.[7] .................................................. G02B 6/02
(52) U.S. Cl. ...................................................... 385/123
(58) Field of Search ................................. 385/123–128, 385/100

(56) References Cited

U.S. PATENT DOCUMENTS

2003/0044147 A1 * 3/2003 Shimoda et al. ............. 385/123

FOREIGN PATENT DOCUMENTS

| JP | 63-2008 | 1/1988 |
| JP | 63-306406 | 12/1988 |
| JP | 4-25685 | 6/1992 |
| JP | 10-123342 | 5/1998 |
| WO | 00/41011 | 7/2000 |

* cited by examiner

Primary Examiner—Khiem Nguyen
(74) Attorney, Agent, or Firm—McDermott, Will & Emery

(57) ABSTRACT

An optical fiber (1) which does not readily suffer influences of side pressures and can realize superior transmission characteristics, having a glass part (2, 3) having a core (2) and at least one cladding (3) and at least one covering layer (4a, 4b) formed around the glass part (2, 3), characterized in that the Young's modulus at 23° C. of the covering layer (4) without the glass part (2, 3) is not greater than 400 MPa. The Young's modulus measurement of the covering layer (4) is obtained by removing the glass part (2, 3) from the optical fiber (1) and putting the covering layer (4) to a tensile test.

7 Claims, 7 Drawing Sheets

OPTICAL FIBER

TECHNICAL FIELD

This invention relates to an optical fiber which has excellent transmission characteristics and can be used ideally in an optical fiber cable and an optical fiber coil.

BACKGROUND ART

An optical fiber has inside it a glass part made up of a core and a cladding, and has outside this cladding a resin covering layer made up of one layer or a plurality of layers. It is well known that when an optical fiber suffers a side pressure it undergoes local bending, and this bending results in a worsening of transmission loss. Transmission loss caused by bending is called 'bend loss'. There are two different types of bend loss: 'micro bend loss', which occurs at local minute bend parts resulting for example from adjacent optical fibers overlapping and exerting side pressures on each other; and 'macro bend loss', which occurs as a result of an optical fiber itself describing an arc when it is laid. If the radius of curvature of the arc described by an optical fiber itself is large, macro bend loss does not occur (or is small enough to be ignored).

Because bend loss occurs at various locations on an optical transmission path, even if the loss at any one location is not that large, over the whole optical transmission path it may become too large to be ignored. Consequently, optical fibers which are resistant to bend loss are being sought after. And also in the case of optical fiber cables having optical fibers inside them, cables which are resistant to bend loss are being sought after.

Also, optical fiber coils, which are formed by winding an optical fiber into a coil, tend to have increased bend loss. An optical fiber coil is an optical component used in optical amplifiers and wavelength-dependent dispersion compensators, polarization mode dispersion compensators and optical fiber gyros and the like. In optical fiber coils of this kind there is a tendency for the above-mentioned resin covering layer to be made thin in order to make the optical fiber in the coiled state compact, and in this case micro bending is more liable to occur. Consequently, in optical fiber coils there is a tendency for worsening of transmission loss caused by bend loss to occur readily.

A known optical fiber coil is disclosed for example in Japanese Patent Application Laid-open No. H10-123342. And specific products include for example Sumitomo Electric Co., Ltd. coils of type numbers DCFM-340, DCFM-680, DCFM-1020 and DCFM-1360. An optical fiber coil exerts a desired effect on an optical signal along its optical path. For example, an optical fiber coil used in an optical amplifier is an optical fiber doped with erbium (Erbium Doped optical Fiber, or EDF) made into a coil, and amplifies an optical signal along the optical path of the optical fiber.

Here, because to amplify light an EDF of a certain length is necessary, the optical fiber is coiled so that it can be received efficiently inside the optical amplifier. The same applies to optical fiber coils used in other optical components besides optical amplifiers, such as wavelength-dependent dispersion compensators, polarization mode dispersion compensators and optical fiber gyros. Optical fiber coils have generally been made by winding an optical fiber onto a bobbin.

However, in a wound optical fiber there remains tension, and this causes micro bend loss to occur. And also, because stress resulting from deformation of the bobbin acts on the optical fiber due to a difference in linear expansion coefficient between the bobbin and the optical fiber, the transmission loss varies with temperature. To overcome this, as in the optical fiber coil disclosed in the above-mentioned application, various contrivances have been applied, and bobbin less optical fiber coils and bobbin structures with which the same effects as these can be obtained have been studied.

However, even with these various contrivances, it has not been possible to completely remove bend loss (micro bend loss) occurring as a result of minute bends in the optical fiber. And thus for optical fiber coils also, improvements providing further enhancement of transmission characteristics have been sought after.

DISCLOSURE OF THE INVENTION

An optical fiber provided by the present invention comprises a glass part having a core and at least one cladding and at least one covering layer formed around the glass part, and the Young's modulus at 23° C. of the covering layer, after the glass part is removed from it, is not greater than 400 MPa. The optical fiber referred to here is not only a single core optical fiber and also includes multi-core optical fibers (for example tape-form optical fibers).

Here, preferably, the covering layer is made two layers, an inner layer covering and an outer layer covering, and the Young's modulus measured by the PIM method of this inner layer covering is made not greater than 0.8 MPa. If this is done, transmission loss can be reduced by an effect of the inner layer covering absorbing side pressures acting on the outer layer covering so that they do not reach the glass part.

And, here, the sliding friction coefficient of the outermost layer of the covering layer is preferably made not greater than 0.20. This sliding friction coefficient is a sliding friction coefficient relating to a covering layer of an optical fiber having inside it a glass part. The method by which the sliding friction coefficient is measured will be discussed later.

When this is done, contacting sites on adjacent optical fibers slide over each other readily; side pressure components other than components normal to the surfaces of the optical fibers are lightened; and the side pressures that the optical fibers exert on each other decrease. As a result, with an optical fiber according to this invention, transmission loss can be suppressed.

Also, an optical fiber cable having the optical fiber described above inside it is desirable. The optical fiber cable referred to here is an optical fiber cable having inside it an optical fiber and having outside that a protective covering sheath or the like. Inside the optical fiber cable, besides the optical fiber, there may also be provided a steel wire (high-tensile wire) for taking tensile forces acting on the optical fiber cable, and a spacer having a groove for receiving the optical fiber. The optical fiber cable referred to here includes both cables having inside them a plurality of optical fibers and cables having only one optical fiber, and each optical fiber may be single-core or multi-core.

Preferably, each optical fiber inside the optical fiber cable is a dispersion-compensating optical fiber. The dispersion-compensating optical fiber (hereinafter also called a DCF) referred to here is an optical fiber having a wavelength-dependent dispersion characteristic of the opposite sign to an optical fiber for transmission path use such as a single mode optical fiber, and is capable of canceling out wavelength-dependent dispersion in an optical transmission path.

Normally, it is modulized and used as a DCFM (Dispersion-Compensating optical Fiber Module).

DCFMs are used in dispersion compensators and the like. A dispersion compensator is a device for canceling out wavelength-dependent dispersion in the 1.55 μm wavelength band in order to carry out long-distance, high-capacity optical transmission in the 1.55 μm band using a single mode optical fiber having its zero dispersion wavelength in the 1.3 μm band. This kind of dispersion compensator is made by making into a coil for example by winding on a small-diameter bobbin a long DCF having a wavelength-dependent dispersion in the 1.55 μm band of the opposite sign to that of a single mode optical fiber having its zero dispersion wavelength in the 1.3 μm band.

Also, an optical fiber coil made by coiling the optical fiber described above is desirable. And preferably, in this optical fiber coil, the optical fiber is a dispersion-compensating optical fiber. An optical fiber coil using a dispersion-compensating optical fiber is as discussed above.

And in this kind of optical fiber coil, preferably, the coiled optical fiber is surrounded with a filler and the filler is a resin whose undisturbed penetration as prescribed in JIS K 2220 is in the range of 5 to 200 over the entire measurement temperature range of −40° C. to 100° C. and packs the whole coiled optical fiber and holds it in the coiled state. Undisturbed penetration is prescribed in Japanese Industrial Standards JIS K 2220-1993 (JIS K 2220-1993 2. (14), 5.3.1(4), 5.3.6 etc.). However, whereas in JIS K 2220 the measurement temperature is 25° C., here, a resin whose undisturbed penetration is in the above-mentioned range over the entire measurement temperature range of −40° C. to 100° C. is used.

BEST MODE FOR CARRYING OUT THE INVENTION

An embodiment of an optical fiber according to the invention will now be described, with reference to the drawings.

Figure 1A:
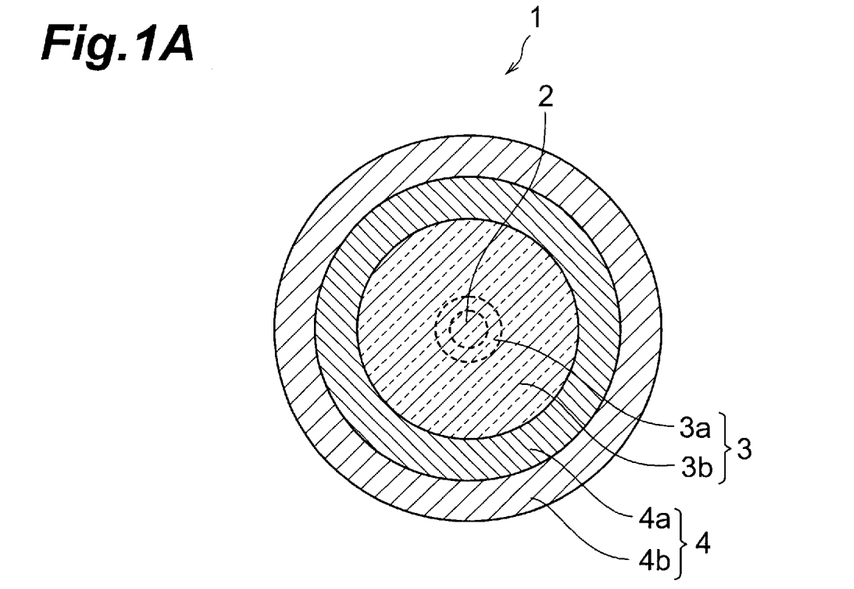
FIG. 1A is a cross-sectional view of an embodiment of an optical fiber according to the invention.

FIG. 1A is a sectional view of the optical fiber 1 of this embodiment. The optical fiber 1 of this embodiment has inside it a glass part (a core 2 and a cladding 3) made of vitreous silica. A resin covering layer 4 is formed on the outside of this glass part, and the resin covering layer 4 protects the glass part inside it.

The cladding 3 is made up of a depressed cladding 3a positioned immediately outside the core 2 and an outer layer cladding 3b outside the depressed cladding 3a. That is, the optical fiber 1 of this embodiment is a double-cladded DCF. The diameter of the core 2 is 2.7 μm, the outer diameter of the depressed cladding 3a is 6.6 μm, and the outer diameter of the outer layer cladding 3b (that is, the outer diameter of the glass part) is 120 μm.

The resin covering layer 4 is made up of a primary covering layer 4a positioned immediately outside the cladding 3 and a secondary covering layer 4b positioned outside the primary covering layer 4a. The thickness of the primary covering layer 4a is 10 μm, and the thickness of the secondary covering layer 4b is 20 μm. That is, the outer diameter of the secondary covering layer 4b (the outer diameter of the optical fiber 1) is 180 μm. The primary covering layer 4a and the secondary covering layer 4b of the resin covering layer 4 on the optical fiber 1 are each made of a UV curable resin such as a urethane acrylate, and the primary covering layer 4a is made of a relatively soft resin while the secondary covering layer 4b is made of a relatively hard resin.

Figure 1B:
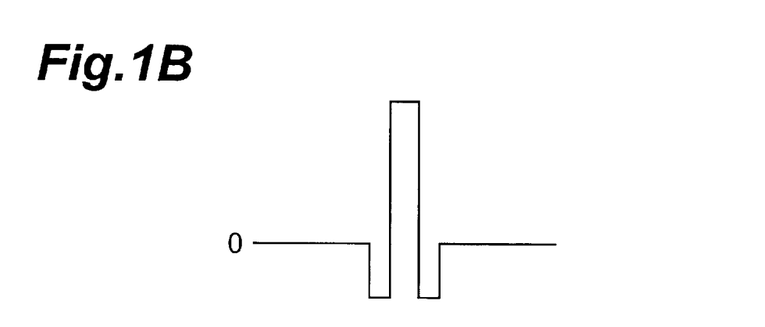
FIG. 1B is a schematic view illustrating the refractive index distribution in a cross-section of an embodiment of an optical fiber according to the invention.

FIG. 1B shows the refractive index distribution of the optical fiber 1 of this embodiment. The distribution graph shown in FIG. 1B shows the variation of the refractive index of the core 2 and the depressed cladding 3a with respect to the outer layer cladding 3b. As shown in FIG. 1B, the relative index difference (increase) Δ+ of the core 2 with respect to the outer layer cladding 3b is 1.9%, and the relative index difference (decrease) Δ− of the depressed cladding 3a with respect to the outer layer cladding 3b is −0.4%.

Figure 2:
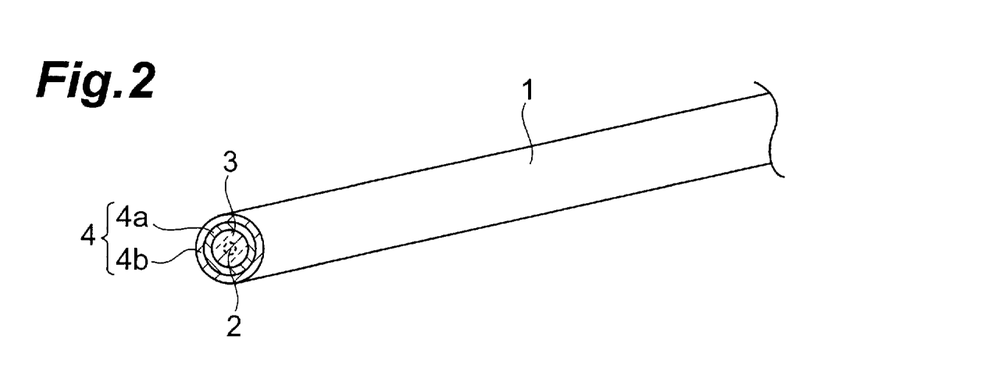
FIG. 2 is a perspective view of the optical fiber shown in FIG. 1.

The wavelength-dependent dispersion in the 1.55 μm wavelength band of this optical fiber 1 is −120 ps·nm$^{-1}$·km$^{-1}$, and the wavelength-dependent dispersion slope in the 1.55 μm wavelength band is −0.28 ps·nm$^{-2}$·km$^{-1}$. The wavelength-dependent dispersion slope shows the wavelength dependence of the wavelength-dependent dispersion value, and is the gradient of the curve (or straight line) showing the wavelength-dependent dispersion value on a graph in which the horizontal axis is wavelength (nm) and the vertical axis is wavelength-dependent dispersion value (ps·nm$^{-1}$·km$^{-1}$). Also, the transmission loss in the 1.55 μm wavelength band is 0.40 dB/km. FIG. 2 is a perspective view of this optical fiber 1.

Also, when the Young's modulus at 23° C. of the resin covering layer 4 of the optical fiber 1 of this embodiment was measured by a measurement method which will be discussed hereinafter, it was not greater than 400 MPa. The Young's modulus measurement method will be explained below. In the following Young's measurement method, if an actual optical fiber is available, the Young's modulus of its covering layer can be measured without a sheet-form sample of the covering layer having to be obtained for the measurement.

First, the optical fiber the Young's modulus of whose covering layer is to be measured is cut to a length of 8 cm, and the cut optical fiber is put in a test tube containing a mixed solution (solvent) of acetone: ethanol=7:3. This test tube is then put in an ultrasonic cleaner containing water, for 30 seconds to 3 minutes. The length of this time is made the minimum length of time after which it is possible to remove the glass part of the optical fiber from inside the covering layer. This is because if even after it has become possible to remove the glass part of the optical fiber from inside the covering layer the optical fiber is left in the ultrasonic cleaner for longer, the covering layer will break up.

Next, the optical fiber is taken out of the test tube, which has been taken out of the ultrasonic cleaner, and the glass part is removed from the covering layer. At this time, ample care is taken not to scratch the covering layer. If the covering layer becomes scratched, the procedure must be started again from the beginning. The covering layer without the glass part is then held for 30 minutes in a thermostat vacuum tank held at pressure 10 kPa (76 mmHg) or below, temperature 60° C., to evaporate the solvent. After that, the covering layer is held overnight in a desiccator, and then a tensile test is carried out with the following conditions. The conditions of the tensile test are: bench mark (length on sample over which tensile force acts)=25 mm; pulling rate=1 mm/min; sample ambient temperature and sample temperature=23° C.; and sample ambient relative humidity 50% RH, and the result is obtained using the 2.5% secant formula.

This Young's modulus measurement method has the object of measuring the Young's modulus of the covering layer from an actual optical fiber. If the covering layer is a single layer, the Young's modulus obtained by the measurement method described above and the Young's modulus measured using a sheet-form sample are approximately equal. When the covering layer has a multi-layer structure extending from an inner layer to an outer layer in the optical fiber, the Young's modulus obtained by the measurement method described above becomes approximately equal to the Young's modulus of the outermost, hardest covering layer. The reason for this is as follows.

Normally, the Young's modulus of an inner covering layer is made smaller than the Young's modulus of an outer covering layer. This is to reduce external forces acting on the glass part of the optical fiber and to prevent influences of temperature changes affecting the glass part. Because of this, there is a difference of about 100 times between the Young's modulus of the inner covering layer and the Young's modulus of the outer covering layer, and the Young's modulus measured by the measurement method described above reflects the Young's modulus of the outer, hard layer. That is, with the measurement method described above, if the covering layer is a single layer, the Young's modulus obtained is approximately equal to the sheet test value of the material of the covering, and if the covering layer is multi-layer, it is approximately equal to the sheet test value of the material of the hardest, outer covering layer among the multiple layers.

When by a measurement method described below the Young's modulus of the primary covering layer (inner layer covering) $4a$ of the optical fiber 1 of this embodiment was measured by the PIM method, it was not greater than 0.8 MPa. The PIM Young's modulus measurement method will be explained below. In this case also, if an actual optical fiber is available, the Young's modulus of its covering layer can be measured without a sheet-form sample of the covering layer having to be obtained for the measurement.

Figure 3A:
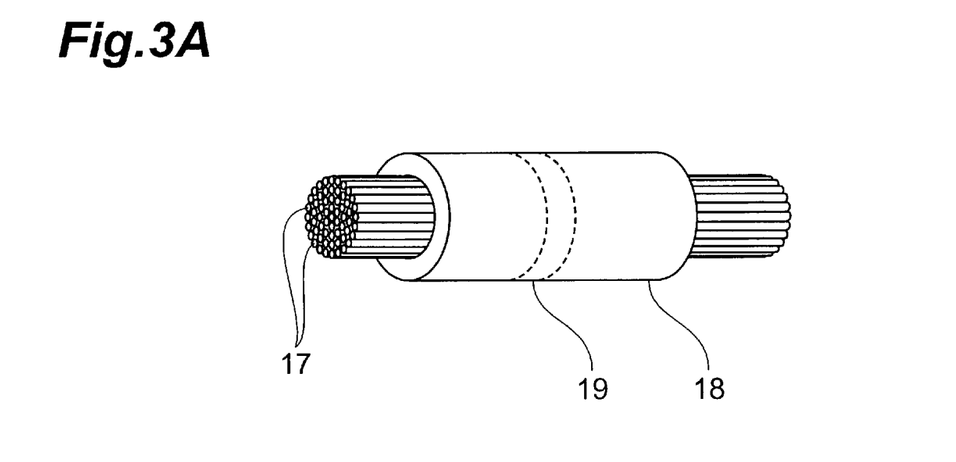
FIG. 3A is a perspective view illustrating a method for preparing a sample for Young's modulus measurement by the PIM method.
Figure 3B:
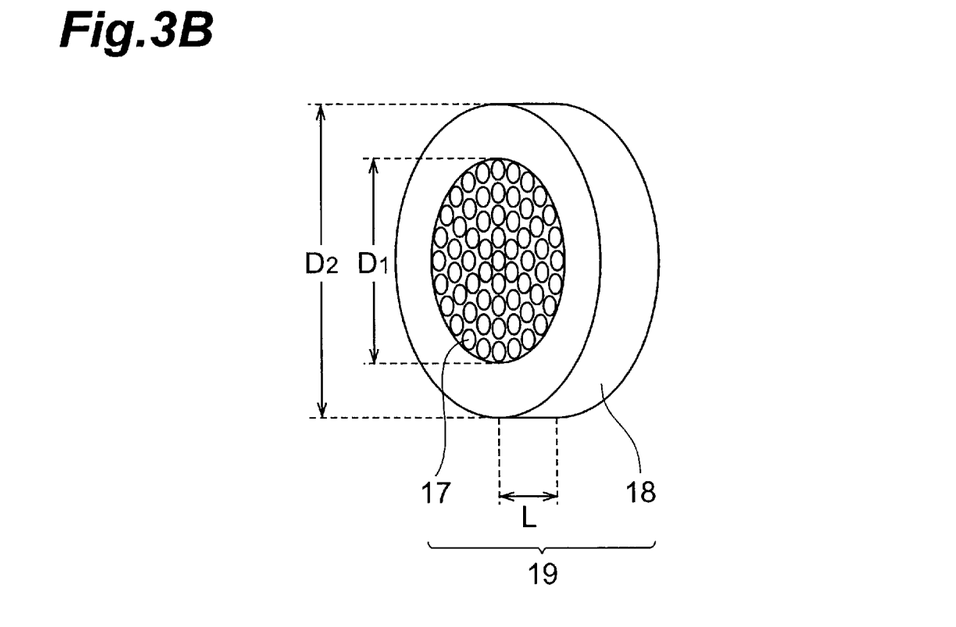
FIG. 3B is a perspective view of a sample for Young's modulus measurement by the PIM method.

FIG. 3A is a perspective view illustrating a method for preparing a sample for PIM-method Young's modulus measurement, and FIG. 3B is a perspective view of the sample. Here, 17 is an optical fiber to be the object of measurement; 18 a pipe; and 19 the sample. The pipe 18 is made of acrylic resin. Enough optical fibers 17 to substantially fill the pipe 18 are inserted into the pipe 18, and an adhesive consisting of an epoxy resin is poured into the gaps between the optical fibers 17 and between the inner wall of the pipe 18 and the optical fibers 17, and hardened. Then, the pipe 18 is cut perpendicularly to its axis at two intermediate locations along the pipe 18, to make a disc-shaped sample 19. Both sides of the sample 19 are polished. The dimensions of the sample 19 are: thickness L=2 mm; pipe inner diameter D1=4 mm; pipe outer diameter D2=8 mm.

Figure 4A:
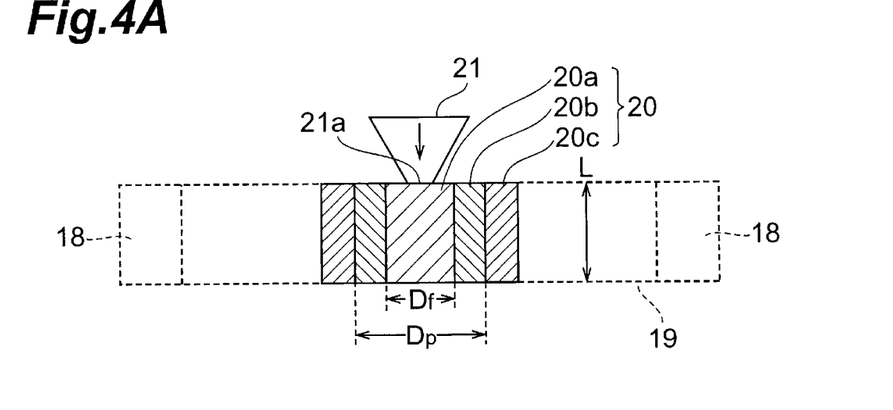
FIG. 4A is a schematic sectional view of the sample shown in FIG. 3B (before the application of a load) illustrating a method for obtaining a relationship between load and displacement of when a load is applied to the glass part of any optical fiber in the sample.
Figure 4B:
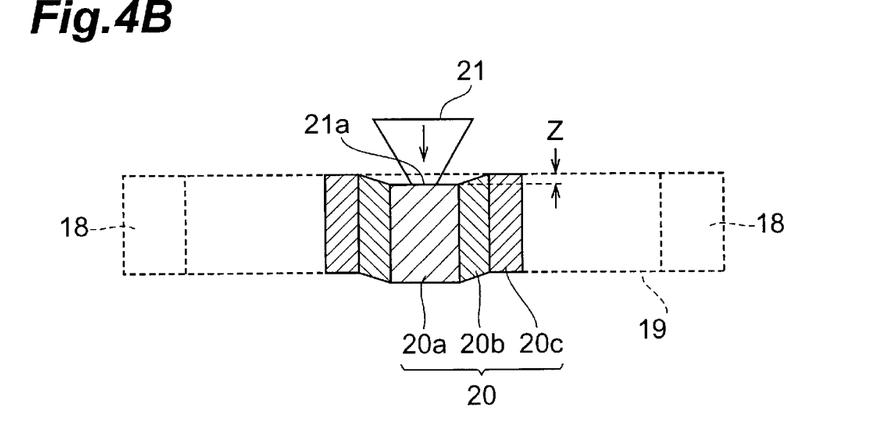
FIG. 4B is a schematic sectional view of the sample shown in FIG. 3B (during the application of a load) illustrating a method for obtaining a relationship between load and displacement of when a load is applied to the glass part of any optical fiber in the sample.

FIG. 4 is a sectional view illustrating a method for obtaining a relationship between load and displacement for any one of the optical fibers clustered in the sample 19, FIG. 4A showing a state before a load is applied and FIG. 4B showing a state during load application. 20 is an optical fiber; 20a the glass part of the optical fiber; 20b an inner layer covering; 20c an outer layer covering; 21 a load-applying pin; and 21a the end face of the load-applying pin 21. The load-applying pin 21 is shaped like an inverted truncated cone, and the diameter of its end face 21a is 50 μm. The outer diameter Df of the glass part 20a of the optical fiber 20 is normally 100 μm, and the outer diameter Dp of the covering 20b is normally 140 μm.

With the cut and polished faces of the sample 19 kept horizontal, the end face 21a of the load-applying pin 21 is brought to abut with the upper end face of the glass part 20a of any of the optical fibers 20 in the sample 19 and a load is applied. Because the glass part 20a and the outer layer covering 20c are made of a material hard enough for their deformation to be negligible compared to that of the inner layer covering 20b, and the amount of deformation caused to them by the applied load is amply small, only the inner layer covering 20b part deforms under the load applied with the load-applying pin 21. As a result, as shown in FIG. 4B, the load-applying pin 21 and the glass part 20a displace downward.

From the values of this loading and displacement of the load-applying pin 21, the Young's modulus of the inner layer covering is obtained using the following formula. However, because when the load S is small the displacement Z is not proportional to the load S, the change ΔZ in the displacement Z is found in a place where the relationship between Z and S is substantially straight-line, for example in the range where the load S is between 5 mN and 75 mN (and the change in load ΔS=70 mN), and this value is used.

$$E = (1+.)\Delta S \times \ln(Dp/Df)/(\pi L \Delta Z)$$

where

| | |
|---|---|
| E: | Young's modulus of inner layer covering (N/mm²) |
| ΔS: | change in load on load-applying pin (mN) (in this case, 75 mN − 5 mN = 70 mN) |
| Dp: | outer diameter of inner layer covering (μm) = 140 μm |
| Df: | outer diameter of optical fiber (μm) = 100 μm |
| L: | thickness of sample (mm) = 2 mm |
| ΔZ: | change in displacement of load-applying pin (μm) |
| .: | Poisson's ratio (in this case, 0.45) |

When the sliding friction coefficient of the outermost layer (the secondary covering layer 4b) of the resin covering layer 4 of this embodiment was measured by a measurement method which will be discussed below, it was not greater than 0.20. In this case also, if the following measurement method is used, as long as an actual optical fiber is available, this sliding friction coefficient can be measured without a sheet-form sample of the covering layer having to be obtained for the measurement.

A specific method for making the sliding friction coefficient of the secondary covering layer 4b less than 0.20 is to add a reactive silicone or a silicone oil such as silicone acrylate resin or the like to the secondary covering layer 4b to make its surface slippery. Or both a reactive silicone and a silicone oil may be added. For example, by including 5% by weight of a silicone oil in the outermost covering layer of an ordinary optical fiber it is possible to bring its sliding friction coefficient to 0.18. This compares with a sliding friction coefficient of 0.33 for an optical fiber containing no silicone oil (content 0%) in its outermost covering layer. Here, the content of the reactive silicone or silicone oil or the like is preferably at least 3%. When it is less than 3%, it is difficult to effectively make the covering layer surface slippery.

Figure 5A:
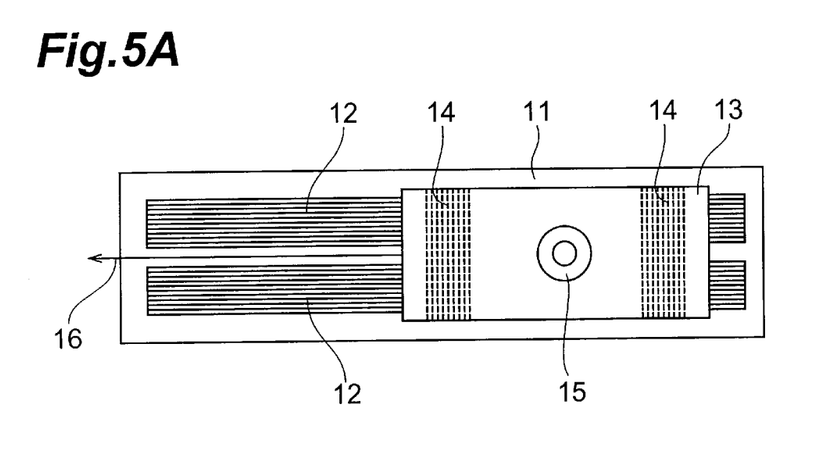
FIG. 5A is a plan view of a jig used in measuring a sliding friction coefficient.
Figure 5B:
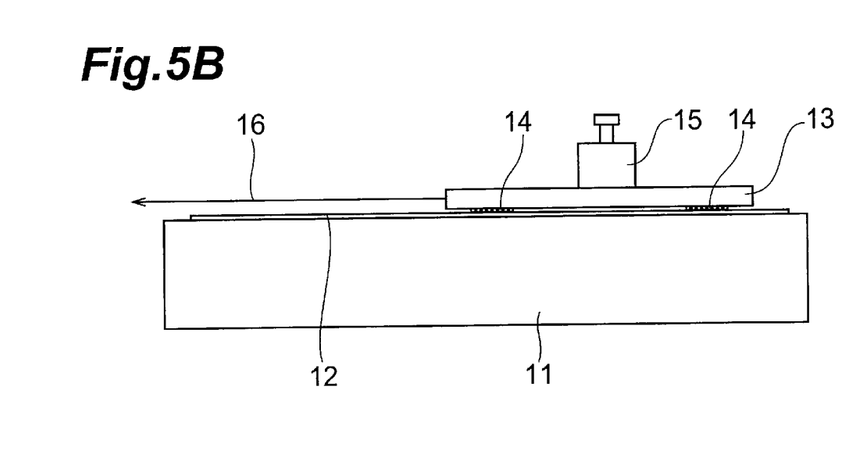
FIG. 5B is a front view of a jig used in measuring a sliding friction coefficient.
Figure 5C:
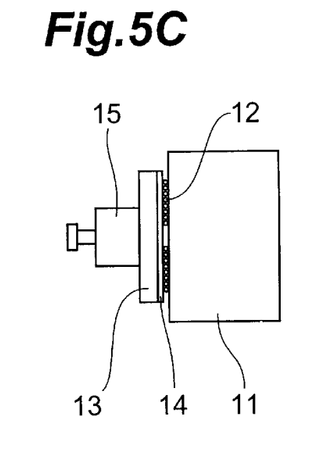
FIG. 5C is a side view of a jig used in measuring a sliding friction coefficient.

The method for measuring the sliding friction coefficient of the outermost covering layer will now be described. FIGS. 5A through 5C are views illustrating a sliding friction coefficient measurement method, FIG. 5A being a top view, FIG. 5B a front view and FIG. 5C a side view. 11 is a base member; 12 a base side fiber; 13 a slide member; 14 a slide side fiber; 15 a weight; and 16 a thread. The base member 11 has a horizontal, flat upper face and is made of a hard material such as a metal like aluminum or a hard plastic. The slide member 13 is a glass plate of length 77 mm×width 28 mm×thickness 1 mm and mass 4.9 g. The weight 15 is of mass 50 g.

For the measurement, 60 fibers of length 20 cm and 30 fibers of length 28 mm are prepared from the optical fiber to be the object of measurement. Of these, the optical fibers of length 20c m are divided into two groups of 30 and used as base side fibers 12. The fibers of length 28 mm are divided into two groups of 15 and used as slide side fibers 14. The base side fibers 12 are arranged in parallel and closely within the groups on the upper face of the base member 11 and affixed to the top of the base member 11 using double-sided adhesive tape or an adhesive. The spacing between the two groups is made 10 mm. The slide side fibers 14 are arranged in parallel without gaps within the groups with their length direction oriented in the width direction of the slide member 13 and affixed to one face of the slide member 13 using double-sided adhesive tape or an adhesive. The two groups of slide side fibers 14 are disposed in positions 5 mm away from the length direction ends of the slide member 13.

Then, the slide member 13 is placed with its slide side fibers 14 side downward on the base side fibers 12 affixed to the base member 11. At this time, the length direction of the slide side fibers 14 is kept perpendicular to the length direction of the base side fibers 12, and the length direction center of the slide side fibers 14 is kept between the two groups of base side fibers 12. The weight 15 is then placed on the middle of the upper face of the slide member 13, and a thread 16 for pulling the slide member 13 with is attached to the middle of one of the length direction ends of the slide member 13.

With the slide member 13 and the weight 15 placed on the base member 11 like this by way of the base side fibers 12 and the slide side fibers 14 disposed perpendicularly to each other, the thread 16 attached to the slide member 13 is pulled by a tensile tester (not shown) in the length direction of the base side fibers 12, i.e. the direction of the arrow. The pulling rate at this time is made 60 mm/min, and the ambient temperature is kept to 230° C.±20° C. The value of the maximum tensile force (N) at this time divided by the weight corresponding to the sum of the masses of the slide member 13, the slide side fibers 14 and the weight 15, i.e. 0.54N, is obtained.

Then, the slide side fibers and the base side fibers are replaced with new ones and the same measurement procedure is carried out again. This measurement procedure is repeated until it has been carried out 10 times, and the average of the ten values of the maximum tensile force (N)/total mass (0.54N) thus obtained is taken as the sliding friction coefficient of the outermost covering layer of the object optical fiber. That is, the average of the maximum static friction coefficients obtained in a test using the test apparatus described above is the sliding friction coefficient.

Because the Young's modulus explained above of the covering layer of the optical fiber 1 is made not greater than 400 MPa, when the optical fiber 1 is bent, the force exerted by the resin covering layer 4 on the glass part consisting of the core 2 and the cladding 3 is lightened, and bend loss is reduced. When the Young's modulus exceeds 400 Pa, this bend loss is not reduced.

And because in the optical fiber 1 of this embodiment the sliding friction coefficient of the outermost layer (the secondary covering layer 4b) of the resin covering layer 4 is made not greater than 0.20, contacting sites on adjacent optical fibers 1 slide over each other readily; side pressure components other than components normal to the surfaces of the optical fibers 1 are lightened; and the side pressures that the optical fibers 1 exert on each other decrease. As a result, with the optical fiber 1, micro bend loss caused by side pressures is reduced and transmission loss can be suppressed. When the sliding friction coefficient exeeds 0.20, because contacting sites on adjacent optical fibers 1 do not slide over each other , side pressures tend to act at those sites, micro bend loss occurs and transmission loss is not reduced.

To check the effect of the Young's modulus o f the resin covering layer 4 being made not greater than 400 MPa and the effect of the sliding friction coefficient of the outermost layer (the secondary covering layer 4b) being made not greater than 0.20, an optical fiber coil was made using the optical fiber described above and its transmission loss was measured. The optical fiber was made into an optical fiber coil for the measurement because coiling an optical fiber tends to cause bend loss such as micro bend loss and macro bend loss to occur.

Here the measurement was carried out after the optical fiber 1 was made into an optical fiber coil. A 5 km length of the optical fiber 1 was wound onto an aluminum bobbin 8 having a fiber winding part 8a of the kind shown in FIG. 6A to obtain the optical fiber coil 9 shown in FIG. 6B, after which the bobbin 8 was removed to leave a coil state. Signal light of wave length 1.6 μm was used for the measurement, and the transmission loss at room temperature (23° C.) and at −20° C. was measured.

Figure 6A:
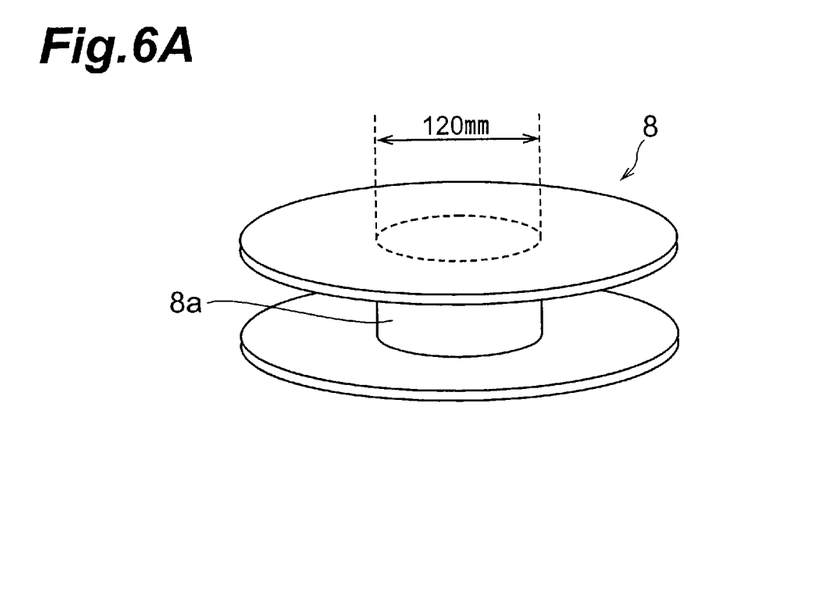
FIG. 6A is a perspective view of a bobbin (before an optical fiber is wound on it) used in an optical fiber coil.
Figure 6B:
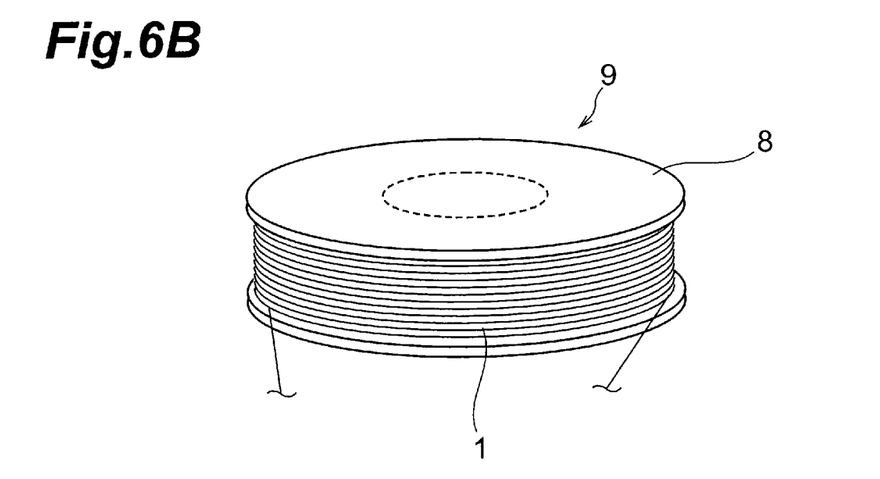
FIG. 6B is a perspective view of a bobbin (after an optical fiber is wound on it) used in an optical fiber coil.

The outer diameter of the fiber winding part 8a was 120 mm. The optical fibers used in the test had the different Young's modulus of the resin covering layer 4 and the different sliding friction coefficients of the outermost layer (the secondary covering layer 4b) shown in [Table 1]. Embodiments 1 through 3 in [Table 1] are the optical fiber 1 of the present invention, and for comparison with these the test was also carried out on Comparison Examples 1 and 2. The test results are also shown in [Table 1].

TABLE 1

| | Young's Modulus (MPa) | Sliding Friction Coefficient | Transmission Loss (dB/km) | |
|---|---|---|---|---|
| | | | RoomTemp. (23° C.) | −20° C. |
| Embodiment 1 | 400 | 0.18 | 0.33 | 0.38 |
| Embodiment 2 | 200 | 0.18 | 0.33 | 0.35 |
| Embodiment 3 | 400 | 0.25 | 0.35 | 0.39 |
| Comp. Ex. 1 | 800 | 0.25 | 0.50 | 1.0 |
| Comp. Ex. 2 | 800 | 0.18 | 0.33 | 0.83 |

As is clear from the results shown in [Table 1], it was found that the transmission characteristics are superior when the Young's modulus of the resin covering layer 4 is 400 MPa or less (Embodiment 3 and Comparison Example 1; Embodiments 1, 2 and Comparison Example 2). Also, it was found that the transmission characteristics are superior when the sliding friction coefficient of the outermost covering layer (the secondary covering layer 4b) is 0.20 or less (Embodiment 1 and Comparison Example 3; Comparison Example 1 and Comparison Example 2). Of course, it is preferable if the Young's modulus of the resin covering layer 4 is 400 MPa or below and also the sliding friction coefficient of the outermost covering layer (the secondary covering layer 4b) is 0.20 or below, and this is the case in which the best transmission loss is obtained (Embodiments 1, 2).

To investigate the effect of only making the sliding friction coefficient of the outermost layer (the secondary covering layer 4b) of the resin covering layer 4 not greater than 0.20 (with the Young's modulus of the resin covering layer 4 not necessarily being 400 MPa or below), the following measurement was also carried out. The optical fiber used here was a DCF, and for the measurement it was made into a DCF coil bundle.

The cross-section of this DCF is the same as that shown in FIG. 1, but its dimensions were different from that described above. The outer diameter of the optical fiber 1 (i.e. the outer diameter of the secondary covering layer 4b) was 180 μm, the outer diameter of the primary covering layer 4a was 140 μm, and the outer diameter of the glass part (i.e. the outer diameter of the cladding 3) was 10 μm. The layer thicknesses of the primary covering layer 4a and the secondary covering layer 4b were each 20 μm. The outer diameter of the core 2 was 2.65 μm, the outer diameter of the depressed cladding 3a was 7.58 μm, and the outer diameter of the outer layer cladding 3b was 10 μm. The relative index difference (increase) Δ+ of the core 2 with respect to the outer layer cladding 3b was 2.1%, and the relative index difference (decrease) Δ− of the depressed cladding 3a with respect to the outer layer cladding 3b was −0.4%. At wavelength 1.55 μm, the wavelength-dependent dispersion and the wavelength-dependent dispersion slope of this optical fiber were respectively −100 ps·nm$^{-1}$·km$^{-1}$ and −0.29 ps·nm$^{-2}$·km$^{-1}$.

The covering on the optical fiber was two-layered, and the materials of the inner layer covering and the outer layer covering were as shown in [Table 2] below. The covering resin material types were as follows:

UV resin a: relatively soft urethane acrylate resin (Young's modulus by PIM method: 1.2 MPa)

UV resin b: urethane acrylate resin softer still than UV resin a (Young's modulus by PIM method: 0.7 MPa)

UV resin A: relatively hard urethane acrylate resin with silicone acrylate resin added UV resin B: relatively hard urethane acrylate resin with silicone oil added UV resin C: relatively hard urethane acrylate resin (no silicone acrylate resin or silicone oil added)

TABLE 2

| | Covering Material | | | | Trans- |
|---|---|---|---|---|---|
| | Inner Layer Covering | Outer Layer Covering | Sliding Friction Coefficient of Outer Layer Covering Surface | Coil State | mission Loss Increase (dB/km) |
| Ref. Ex. 1 | UV resin a | UV resin A | 0.18 | bobbin | 0.08 |
| Ref. Ex. 2 | UV resin a | UV resin A | 0.18 | no bobbin; filler | 0.03 |
| Ref. Ex. 3 | UV resin b | UV resin A | 0.18 | no bobbin; filler | 0.02 |
| Ref. Ex. 4 | UV resin a | UV resin B | 0.18 | no bobbin; filler | 0.03 |
| Comp. Ex. 3 | UV resin a | UV resin C | 0.25 | bobbin | 0.35 |
| Comp. Ex. 4 | UV resin a | UV resin C | 0.25 | no bobbin | 0.15 |

A 250 μm thick sheet of the relatively hard urethane acrylate resin mentioned above was hardened by ultraviolet irradiation and a no. 2 dumbbell sample piece was taken from it and its Young's modulus measured in accordance with JIS K 7113, with a pulling rate of 1 mm/min, and found to be 700 MPa.

For each of the optical fibers made with different types of covering resin the sliding friction coefficient of the outermost layer (the secondary covering layer 4b) was measured by the method described above, and the results shown in [Table 2] above were obtained. According to these results, in all of the Reference Examples 1 through 4 the sliding friction coefficient was less than 0.20. And in Comparison Examples 3 and 4 the sliding friction coefficient was large, at 0.25.

Next, a 5 km length of the optical fiber was wound into a coil on a bobbin of core diameter 120 mm at a winding tension of 0.4N. The coil state in each case was as shown in [Table 2] from among the following three:

with bobbin: wound on a bobbin no bobbin: wound on a bobbin and then removed from the bobbin (the bundled state of the coil in Comparison Example 4 did not disintegrate much after the coil was removed from the bobbin)

no bobbin; filler: wound on a bobbin, removed from the bobbin, and then packed in a silicone gel-form filler (the coils of Reference Examples 2 through 4 disintegrated slightly when removed from the bobbin)

When for each of the finished Reference Examples 1 through 4 and Comparison Examples 3 and 4 the transmission loss increase at wavelength 1.6 μm from before the optical fiber was wound on the bobbin of core diameter 120 mm was measured, the results shown in [Table 2] were obtained. Here the respective transmission loss increases at wave length 1.6 μm were compared to facilitate comparison, because even when the transmission loss increase at wavelength 1.55 μm is very small the transmission loss increase at wavelength 1.6 μm is normally relatively large.

From a comparison of Reference Examples 1 through 4 and Comparison Examples 3 and 4 it can be seen that the transmission loss increase at wavelength 1.6 μm is smaller when the sliding friction coefficient of the outermost layer (the secondary covering layer 4b) is lower. And if the friction coefficient is 0.18, even if the coil is still wound on the bobbin, the transmission loss increase at wavelength 1.6 µm can be kept to a small value of about 0.08 dB/km. And from a comparison of Reference Example 1 and Comparison Example 2 it can be seen that the transmission loss increase is lower when after the optical fiber is wound on the bobbin the coil is removed from the bobbin before being packed in the filler than when it is packed in the filler while still on the bobbin.

From a comparison of Reference Example 2 and Reference Example 3 it can be seen that if the inner layer covering (the primary covering layer 4a) is made an even softer one the transmission loss increase can be suppressed further. And from a comparison of Reference Example 2 and Reference Example 4 it can be seen that the addition of silicone acrylate resin and the addition of a silicone oil to the material of the outer layer covering (the secondary covering layer 4b) each have the same level of effect of suppressing transmission loss increase.

TABLE 3

|  | Sliding Friction Coefficient of Outer Layer Covering Surface | Transmission Loss (dB/km) | |
| --- | --- | --- | --- |
|  |  | RoomTemp. (23° C.) | −20° C. |
| Ref. Ex. 5 | 0.18 | 0.33 | 0.40 |
| Ref. Ex. 6 | 0.17 | 0.33 | 0.39 |
| Comp. Ex. 5 | 0.25 | 0.50 | 0.53 |

To further investigate the effect of only making the sliding friction coefficient of the outermost layer (the secondary covering layer 4b) of the resin covering layer 4 not greater than 0.20 (with the Young's modulus of the resin covering layer 4 not necessarily being 400 MPa or below), the following measurement was also carried out. Again, the optical fiber used for the measurement was a DCF, and although its cross-section was the same as that shown in FIG. 1 the dimensions of its parts were different.

The diameter of the core 2 was 2.7 µm, the outer diameter of the depressed cladding 3a was 6.6 µm, and the outer diameter of the outer layer cladding 3b (i.e. the outer diameter of the glass part) was 120 µm. The thickness of the primary covering layer 4a was 40 m, and the thickness of the secondary covering layer 4b was 120 µm. That is, the outer diameter of the optical fiber 1 (the outer diameter of the secondary covering layer 4b) was 240 µm.

The refractive index distribution of this optical fiber 1 was similar to that shown in FIG. 2, but the relative index difference (increase) Δ+ of the core 2 with respect to the outer layer cladding 3b was 1.9%. The relative index difference (decrease) Δ− of the depressed cladding 3a with respect to the outer layer cladding 3b was −0.4%. At 20° C. the Young's modulus of the primary covering layer 4a was 0.98 MPa and the Young's modulus of the secondary covering layer 4b was 784 MPa (the Young's modulus here was measured using a sheet sample).

The wavelength-dependent dispersion of this optical fiber 1 in the 1.55 µm wavelength band was −120 ps·nm$^{-1}$·km$^{-1}$, and the wavelength-dependent dispersion slope in the 1.55 µm wavelength band was −0.28 ps·nm$^{-2}$·km$^{-1}$. The transmission loss in the 1.55 µm wavelength band was 0.33 dB/km.

The sliding friction coefficient of the outermost layer (the secondary covering layer 4a) of the optical fiber 1 described above was varied and an experiment was carried out. In the experiment, 5 km of the optical fiber with its sliding friction coefficient varied was wound on a bobbin of diameter 120 mm and then the bobbin was removed and the transmission loss of the coiled optical fiber was measured. The signal light used at the time of the measurement was 1.6 µm, and the temperature at the time of measurement was room temperature (23° C.) and −20° C.

The results of the experiment are shown in [Table 3]. As can be seen from [Table 3], when the sliding friction coefficient of the outermost layer (the secondary covering layer 4a) is not greater than 0.20, transmission loss can be kept low.

Figure 7:
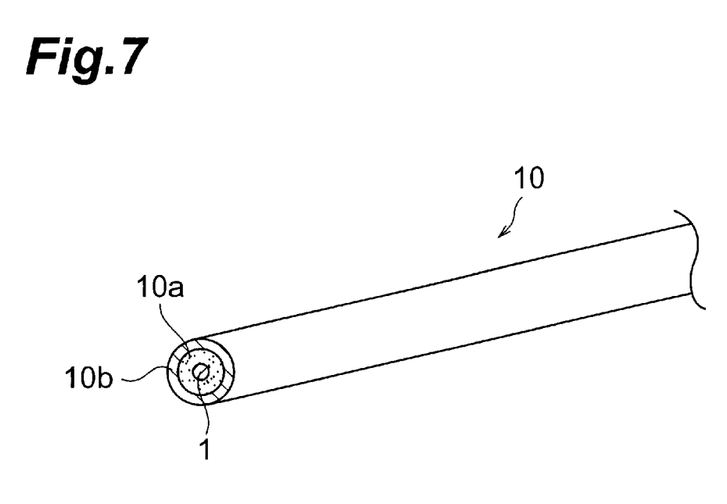
FIG. 7 is a perspective view of an optical fiber cable.

Next, an optical fiber cable using the optical fiber discussed above will be described. This optical fiber cable 10 is shown in FIG. 7. The optical fiber cable 10 has inside it the optical fiber 1 described above. The optical fiber cable 10 of this embodiment is a cable having one single core optical fiber 1 of the kind described above and is also known as an optical fiber cord.

The optical fiber cable 10 has at its center the optical fiber 1 described above, and around that is formed a cushioning layer 10a. The cushioning layer 10a is made of fibers or the like, and on the outside of this is a covering layer 10b made out of a synthetic resin. Although an optical fiber cable having inside it only a single optical fiber is being taken as an example here, such cables sometimes have a steel wire (high-tensile wire) for taking tensile forces acting on the optical fiber cable and a spacer having a groove for receiving the optical fiber. And the optical fiber cable may have inside it a plurality of optical fibers, or an optical fiber inside it may be a multi-core optical fiber (a tape-form optical fiber, or optical fiber ribbon).

An optical fiber cable may with its covering sheath or steel wire exert side pressures and distortion on the optical fiber. And when there are multiple optical fibers, the optical fibers may exert side pressures on each other. However, because as described above the optical fiber 1 does not readily suffer transmission loss increases caused by side pressures and has superior transmission characteristics, the optical fiber cable 10 of this embodiment can also have excellent transmission characteristics.

Figure 8:
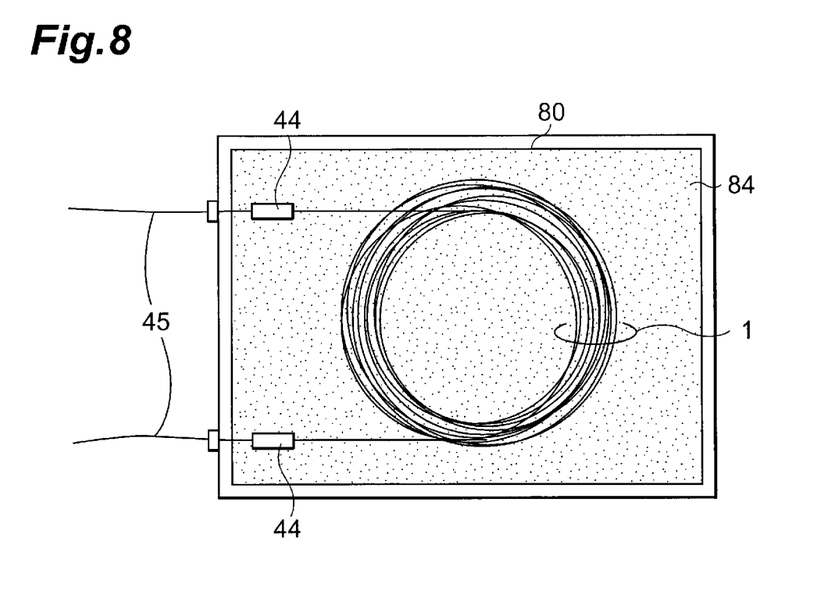
FIG. 8 is a plan view of an optical fiber module (with its cover opened).
Figure 9:
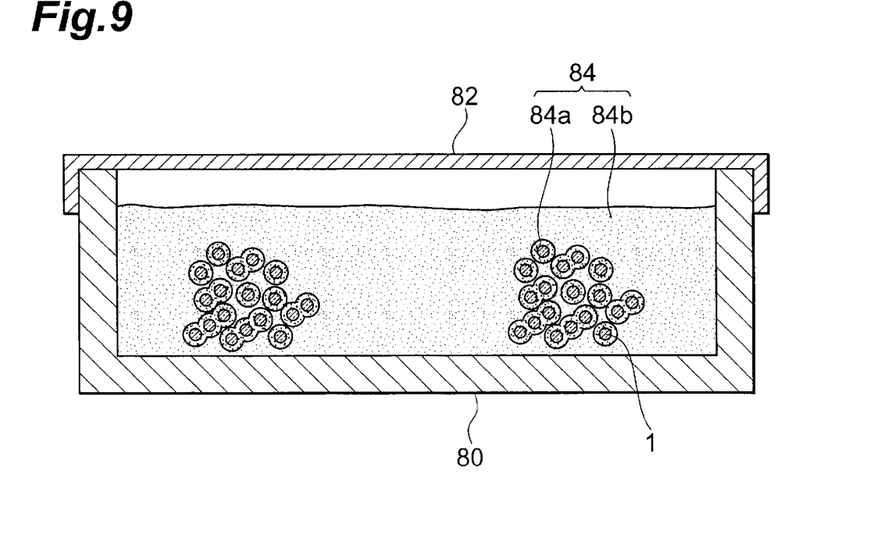
FIG. 9 is a sectional view of an optical fiber module.

Next, an optical fiber coil using the optical fiber 1 discussed above will be described. As shown in FIG. 8 and FIG. 9, as this optical fiber coil, a coiled optical fiber 1 whose winding distortion has essentially been released is received in a receiving case 80 having a rectangular bottom. The ends of the optical fiber 1 are connected by fused parts 44 to pigtail fibers 45. The inside of the receiving case 80 is filled with a filler 84, which packs in the optical fiber 1. A cover 82 is fitted to the receiving case 80 and sealed.

The coiled optical fiber 1 is embedded within the filler 84. In addition to the optical fiber 1 itself being resistant to transmission loss increases caused by side pressures, transmission loss increases are also prevented by the optical fiber coil having being removed from the bobbin. Because it has been removed from the bobbin, micro bends forming as a result of the optical fiber 1 being pressed against the bobbin under the winding tension or by adjacent winds of the optical fiber 1 exerting side pressures on each other also tend to be eliminated. And because its coiled state is held by the filler 84, changes in transmission characteristics caused by uncoiling of the optical fiber 1 do not occur either.

As shown in FIG. 9, the filler 84 is made up of a fluid part 84a and an elastic solid part 84b. The part making contact with the optical fiber 1 is the fluid part 84a, which is liquid or semi-liquid, and outside of this is the elastic solid part 84b, which has some elasticity. Here, liquid or semi-liquid refers to a state such that the optical fiber 1 can change its position freely inside the fluid part 84a and such that after it changes its position it essentially is not subjected to a force from the liquid or semi-liquid part tending to return it to the original position.

Here, the fluid part 84a and the elastic solid part 84b are made of the same material, but their hardnesses differ. In the manufacture of the optical fiber coil described above, the coiled optical fiber 1 is embedded in a liquid or semi-liquid filler 84 in a receiving case 80, and the filler 84 is then hardened. Or the coiled optical fiber 1 is placed inside the receiving case 80 first and then the receiving case 80 is filled with the filler 84, and the filler 84 is then hardened.

Here, the fluid part 84a and the elastic solid part 84b described above are formed by the hardness around the optical fiber 1 being made lower than that elsewhere. Although in FIG. 9, for convenience, the boundary between the fluid part 84a and the elastic solid part 84b has been made clear, in this embodiment the boundary between the fluid part 84a and the elastic solid part 84b is not a clearly formed boundary but rather is a boundary at which the hardness changes gradually.

The wavelength-dependent dispersion value and the wavelength-dependent dispersion slope value of the optical fiber 1 are of the opposite sign to those of an optical fiber for transmission path use to be connected to this optical fiber coil. That is, by using this optical fiber coil, it is possible to compensate for wavelength-dependent dispersion arising in an optical fiber of a transmission path. And for wavelength band transmission use, by making the wavelength-dependent dispersion slope the opposite sign, it is possible to compensate for wavelength-dependent dispersion over the wavelength band.

As the filler 84, a silicone resin hardened by heat or ultraviolet radiation, or a highly viscous jelly-form admixture made by swelling a butadiene or silicone rubber with a solvent such as silicone or naphthene and adding another resin or the like as necessary, or an oil such as silicone oil can be used. As mentioned above, here, the fluid part 84a and the elastic solid part 84b are formed by changing the hardness of the filler 84. A method for changing the hardness of the filler 84 will now be described.

Platinum is included in the filler 84 as a catalyst for a hardening reaction. The functioning of this platinum catalyst is inhibited by an isocyanate compound. That is, an isocyanate compound can be used as a hardening inhibitor. Here, this isocyanate compound is included in the secondary covering layer 4b on the outside of the optical fiber 1. The isocyanate compound may be included not only in the secondary covering layer 4b of the optical fiber 1 but also in the primary covering layer 4a.

In this way, hardening of the parts of the filler 84 in contact with the optical fiber 1 is inhibited by the isocyanate compound included in the secondary covering layer 4b, and the fluid part 84a is formed. Parts more than a certain distance away from the optical fiber 1 are not prevented from hardening by the isocyanate compound included in the secondary covering layer 4b and harden normally, whereby the elastic solid part 84b is formed. If in this way the same starting material is used for both the fluid part 84a and the elastic solid part 84b, and the fluid part 84a and the elastic solid part 84b are formed by varying its hardness, the manufacture of an optical fiber coil can be carried out more efficiently.

And, here, including a hardening inhibitor in the secondary covering layer 4b of the optical fiber 1 makes it easy to reduce the hardness of only the parts where the fluid part 84a is to be formed, and is very convenient in the manufacture of the optical fiber coil. And, at this time, platinum is included in the filler 84 as a hardening reaction catalyst, and an isocyanate compound is used as the hardening inhibitor. The combination of a hardening reaction catalyst and a hardening inhibitor for canceling out the action of the catalyst like this utilizes the process of hardening the filler 84 of the optical fiber coil effectively and makes it possible to form the fluid part 84a well.

When the coiled optical fiber 1 is fixed with an ordinary adhesive or resin, because the Young's modulus of the resin when hardened reaches over 500 MPa, excessive pressing forces act on the optical fiber 1 and undesirable bending distortion occurs. By forming a fluid part 84a around the optical fiber 1 like this, on the other hand, it is possible to fix the optical fiber surely without exerting excessive pressing forces which would produce bending distortion on the optical fiber 1 constituting the optical fiber coil.

And, the optical fiber 1 is not rigidly restrained inside the fluid part 84a. Consequently, even if the thermal expansivities of the optical fiber 1 and the filler 84 (the elastic solid part 84b) are different, the optical fiber 1 can to a certain extent change its position inside the fluid part 84a, and temperature changes are prevented from resulting in external forces acting on the optical fiber 1. That is, the optical fiber coil also has superior temperature characteristics. To investigate the effect of only holding the optical fiber with a filler forming a liquid part or a semi-liquid part around the optical fiber (with the Young's modulus of the resin covering layer 4 not necessarily being 400 MPa or below), a 5-cycle, −20° C. to 70° C., 6-hour hold at each, thermal cycle test was carried out.

The optical fiber 1 used here was a double-cladded DCF having the same cross-section as that shown in FIG. 1A, the diameter of the core 2 being 2.7 $\mu$m and the diameter of the depressed cladding 3a being 6.6 $\mu$m. The outer diameter of the glass part was 120 $\mu$m, the thickness d of the primary covering layer 4a was 15 $\mu$m, the thickness e of the secondary covering layer 4b was 15 $\mu$m and the outer diameter f of the optical fiber 1 as a whole was 180 $\mu$m. $\Delta$+ and $\Delta$−, respectively the deviations in the refractive indexes of the core 2 and the depressed cladding 3a with respect to the refractive index of the outer layer cladding 3b, were 1.9% and −0.4%. The wavelength-dependent dispersion and wavelength-dependent dispersion slope of this DCF were respectively −120 ps·nm$^{-1}$·km$^{-1}$ and −0.28 ps·nm$^{-2}$·km$^{-1}$ at wavelength 1.55 $\mu$m, and the transmission loss was 0.40 dB/km. However, in the optical fiber 1 used here, the Young's modulus of the covering layer 4 was not necessarily 400 MPa or less and the Young's modulus of the primary covering layer 4a measured by the PIM method was not necessarily 0.8 MPa or less.

The difference between the maximum value and the minimum value among ten loss measurement values, five loss values measured at −20° C. and five loss values measured at 70° C., was calculated as a level of loss fluctuation. The result was that the loss fluctuation level at measurement wavelength 1.6 $\mu$m was 0.1 dB/km. To make a comparison with the optical fiber coil described above, the same measurement was carried out using an optical fiber coil wherein no fluid part 84a was formed around the optical fiber 1 and instead the filler 84 was hardened completely. The result of this was that the loss fluctuation level at the measurement wavelength 1.6 $\mu$m was 1.2 dB/km. Thus it was found that, as is clear from this result, an optical fiber coil having a filler forming a liquid part or a semi-liquid part of the kind described above has extremely good temperature characteristics.

The elastic solid part 84b after hardening is a material whose undisturbed penetration as prescribed by JIS K 2220 is in the range of 5 to 200 over the entire temperature measurement range of −40° C. to 100° C. The temperature range of −40° C. to 100° C. is the range of temperatures over which the optical fiber coil is actually used. Although by forming the fluid part 84a it is possible to prevent excessive forces from acting on the optical fiber 1, there is still a possibility of the optical fiber 1 making contact with the elastic solid part 84b; however, by giving the elastic solid part 84b the above-mentioned property, external forces can be better prevented from loading the optical fiber 1.

When the undisturbed penetration of the elastic solid part 84b is less than 5, losses at high wavelengths become too large due to micro-bending of the optical fiber 1, and it is of no practical use. And when the undisturbed penetration exceeds 200, because the elastic solid part 84b cannot hold the shape of the fluid part 84a and the coiled state of the optical fiber 1 inside the fluid part 84a, during use the fluid part 84a ceases to be maintained or the coil uncoils, and the transmission characteristics cannot be stabilized.

The receiving case may alternatively be doughnut-shaped in form and its bottom may be curved instead of flat. And if a liquid part is formed, the method by which it is manufactured does not have to be the manufacturing method of the embodiment described above. For example, the whole of the coiled optical fiber may be dipped in oil to coat the optical fiber with oil and then this may be molded with a filler in the normal way. Or there is also the method of adjusting the mix proportions of a base agent and a hardening agent of the filler to facilitate the making of an unhardened state to constitute a liquid part.

And as the form of the liquid part also, just the close proximity of the optical fiber may be the liquid part, as described above, or alternatively a single, large, doughnut-shaped liquid part in which the whole coiled optical fiber can be received may be formed. An optical fiber coil using a filler having the liquid part or semi-liquid part described above can improve the transmission characteristics of any kind of optical fiber.

This invention is not limited to the embodiments described above. For example, the optical fiber 1 is not limited to an optical fiber having a double cladding type refractive index distribution. It can also be an optical fiber having a refractive index distribution called matched cladding type, double core type or segment core type. And a structure wherein the refractive index of a groove part between a central core and a segment core is made smaller than that of a cladding part can be employed. And whereas in the foregoing description the dispersion-compensating optical fiber was taken to be one having a negative wavelength-dependent dispersion at wavelength 1.55 $\mu$m, when the wavelength-dependent dispersion in the 1.55 $\mu$m wavelength band of a single mode optical fiber is negative, the wavelength-dependent dispersion of the dispersion-compensating optical fiber should be made the opposite sign, i.e. a positive wavelength-dependent dispersion.

Also, although the optical fiber 1 described above was a dispersion-compensating optical fiber (DCF), it may be some other type of optical fiber. For example, it may be a single mode optical fiber or a wavelength-dependent dispersion-shifted optical fiber, an NZ wavelength-dependent dispersion-shifted optical fiber, an erbium-doped optical fiber, or a polarization-maintaining optical fiber. Using these kinds of optical fiber also, an optical fiber coil having superior transmission characteristics can be obtained.

The single mode optical fiber (SMF) is an optical fiber designed for the main purpose of transmitting optical signals in the 1.3 $\mu$m wavelength band. When this optical fiber is used to transmit optical signals in the 1.55 $\mu$m wavelength band, the phenomenon of wavelength-dependent dispersion arises. This wavelength-dependent dispersion is compensated for with the above-mentioned DCFM or the like. Reversely, an SMF is also used for compensating with its own positive wavelength-dependent dispersion for an optical signal having a negative wavelength-dependent dispersion from a DC For the like. In this case, it is sometimes modulized for use.

The dispersion-shifted optical fiber (or DSF) is an optical fiber designed for the main purpose of transmitting optical signals in the 1.55 $\mu$m wavelength band. It has the characteristic that its wavelength-dependent dispersion value in the 1.55 $\mu$m wavelength band is zero, but when transmitting with wavelength division multiplexing (hereinafter also referred to as WDM) it suffers the wavelength-dependent dispersion phenomenon on the long and short wavelength sides of this wavelength band. A DSF is sometimes used as an optical fiber for Raman scattering excitation. It is sometimes modulized for use.

The NZ (Non-Zero) dispersion-shifted optical fiber (or NZ-DSF) is an optical fiber designed with the center wavelength at which its wavelength-dependent dispersion is zero somewhat shifted from 1.55 $\mu$m to reduce nonlinear effects arising in the case of the above-mentioned DSF. It is the same as the above-mentioned DSF in that the wavelength-dependent dispersion phenomenon occurs in transmission with WDM. It is sometimes modulized for use.

The erbium-doped optical fiber (or EDF) is an optical fiber whose core has been doped with erbium ions. When while absorbing light of wavelength 0.98 $\mu$m or 1.48 $\mu$m it is fed with 1.55 $\mu$m wavelength band signal light it provides induced emission and increases the power of the signal light. Normally it is used in a modulized state as an optical amplifier (Erbium-Doped optical Fiber Amplifier, or EDFA) or the like.

The polarization-maintaining optical fiber (PMF) is an optical fiber which transmits linearly polarized light with its polarization maintained, and is used in optical fiber gyros and polarization mode dispersion compensators and the like. It is normally used modulized as a PMFM (Polarization-Maintaining optical Fiber Module).

INDUSTRIAL APPLICABILITY

In an optical fiber according to this invention, because the Young's modulus of the covering layer is made not greater than 400 MPa, side forces acting on the optical fiber are moderated by the covering layer and their transfer to the glass part is lessened. As a result, it is possible to prevent worsening of transmission loss caused by side pressures and realize superior transmission loss performance.

Here, if the covering of the optical fiber is made double-layer and the Young's modulus of the inner layer covering measured by the PIM method is made not greater than 0.8 MPa, because side pressures acting on the outer layer covering are absorbed by the inner layer covering and are not readily transmitted to the glass part, increases in transmission loss caused by coiling can be further reduced.

And, when the sliding friction coefficient of the outermost covering layer is made not more than 0.20, adjacent optical fibers slide easily at their contacting surfaces and the external forces they exert on each other are reduced. By this means, it is possible to reduce forces acting on the glass part inside the optical fiber and realize still more superior transmission characteristics.

What is claimed is:

1. An optical fiber coil made by coiling an optical fiber comprising a glass part having a core and at least one cladding and at least one covering layer formed around the glass part, wherein the Young's modulus at 23° C. of the covering layer, after the glass part is removed from it, is not greater than 400 MPa.

2. An optical fiber coil according to claim 1, wherein the optical fiber is a dispersion-compensating optical fiber.

3. An optical fiber coil according to claim 1, wherein a filler surrounds the coiled optical fiber and the filler is a resin whose undisturbed penetration prescribed by JIS K 2220 is in the range of 5 to 200 over the entire temperature measurement range of −40° C. to 100° C. and the filler packs the whole of the optical fiber and holds its coiled state.

4. An optical fiber coil comprising an optical fiber, a receiving case receiving the optical fiber in a coiled state, and a filler packed in the receiving case, wherein a part of the filler in contact with the optical fiber is a liquid or semi-liquid fluid part.

5. An optical fiber coil according to claim 4, wherein the filler outside the fluid part of the filler is an elastic solid part.

6. An optical fiber coil according to claim 5, wherein the fluid part and the elastic solid part of the filler are made from the same material and each have a different hardness.

7. An optical fiber coil according to claim 6, wherein the optical fiber has a covering layer and included in the covering layer is a hardening inhibitor for inhibiting hardening of the filler.

* * * * *